United States Patent [19]

Robandt et al.

[11] 4,086,553
[45] Apr. 25, 1978

[54] COIL ASSEMBLY STRUCTURE

[75] Inventors: William F. Robandt, St. Joseph; Roger J. Cartier, Benton Harbor; Sandy C. Gay, St. Joseph, all of Mich.

[73] Assignee: Whirlpool Corporation, Benton Harbor, Mich.

[21] Appl. No.: 806,292

[22] Filed: Jun. 13, 1977

[51] Int. Cl.² ............................................. H01F 15/10
[52] U.S. Cl. ......................................... 336/192; 85/26; 339/220 C; 403/248; 403/289
[58] Field of Search .................... 336/192; 339/220 R, 339/220 C; 85/26, 31, 79, 39; 403/289, 290, 248, 297, 213

[56] References Cited

U.S. PATENT DOCUMENTS

| 450,811 | 4/1891 | Junquera | 85/26 |
|---|---|---|---|
| 886,515 | 5/1908 | Jude | 85/26 X |
| 990,460 | 4/1911 | Skelton | 85/26 |
| 1,251,566 | 1/1918 | Pigott | 85/79 |
| 1,333,182 | 3/1920 | Minor et al. | 339/220 R |
| 1,716,888 | 6/1929 | Griffith | 85/264 X |
| 2,329,471 | 9/1943 | King | 339/220 R |
| 2,933,007 | 4/1960 | Healy | 339/220 R X |
| 3,359,520 | 12/1967 | Foerster | 336/192 |
| 3,482,865 | 12/1969 | Haller | 85/39 X |

FOREIGN PATENT DOCUMENTS

| 123,087 | 12/1947 | Australia | 85/26 |
|---|---|---|---|

Primary Examiner—Thomas J. Kozma
Attorney, Agent, or Firm—Wegner, Stellman, McCord, Wiles & Wood

[57] ABSTRACT

A coil assembly structure having an improved terminal arrangement whereby the coil electrical terminals are effectively positively maintained in association with the coil bobbin. The terminal includes a portion received in a recess in the bobbin. A spreader element is provided in the recess for urging a biting portion of the terminal into the sidewall of the recess to provide effectively positive maintained association of the terminal with the coil bobbin for improved subsequent electrical connection and encapsulation.

3 Claims, 7 Drawing Figures

U.S. Patent  April 25, 1978  4,086,553
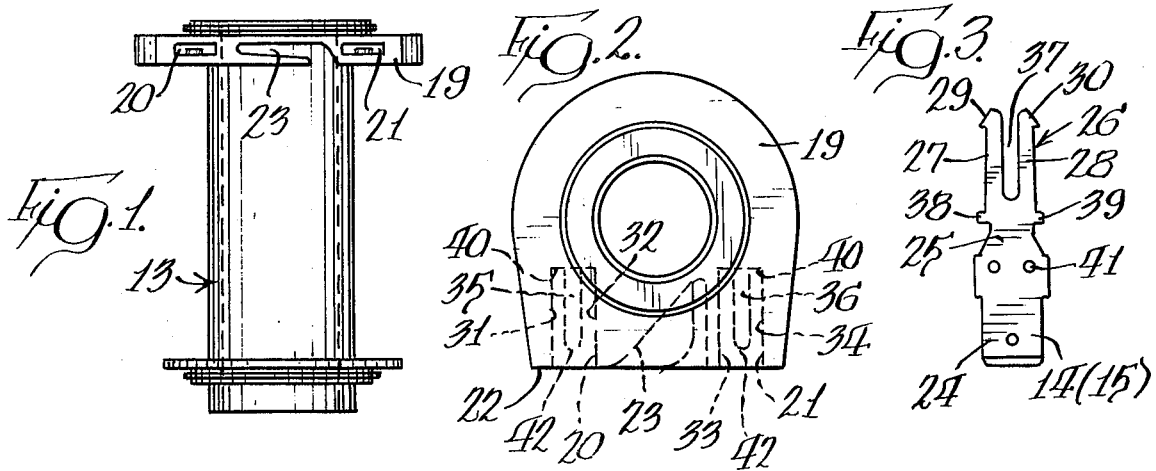
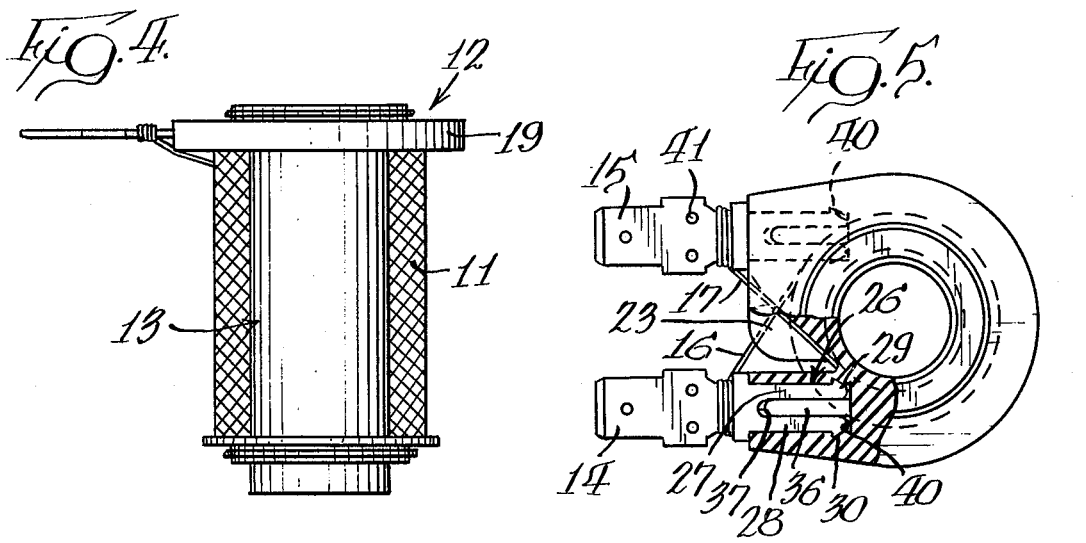
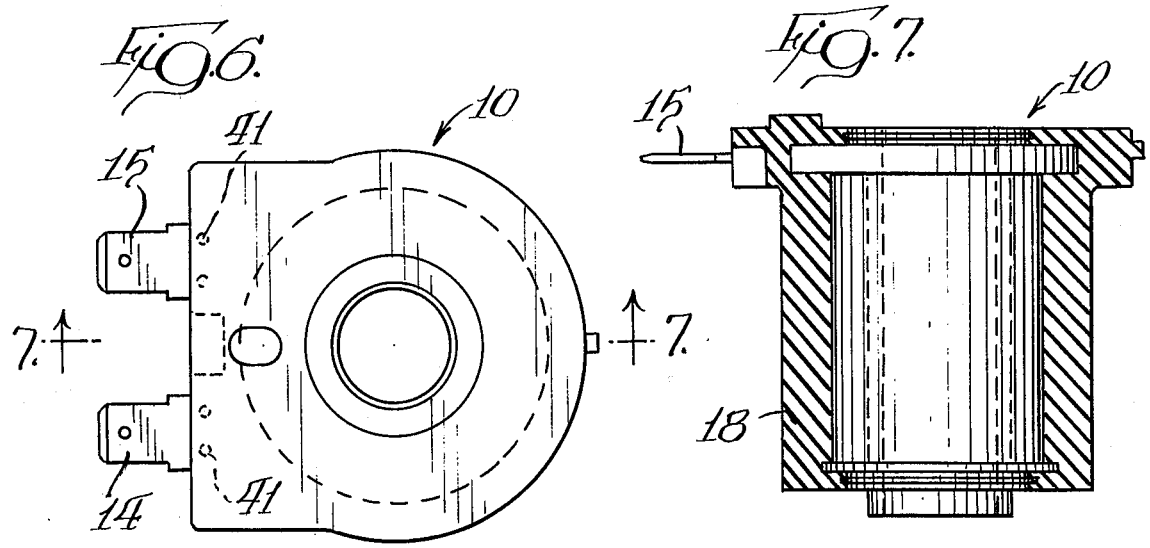

COIL ASSEMBLY STRUCTURE

BACKGROUND OF THE INVENTION

1. Field of the Invention

This invention relates to coil assembly structures and in particular to an improved terminal arrangement for use in such structures.

2. Description of the Prior Art

In U.S. Pat. No. 3,359,520, of James A. Foerster, a pair of electrical terminals are provided in suitable recesses in an end flange of a coil bobbin. The terminals include inner end portions having outwardly projecting biting elements which are urged resiliently into the sidewalls of the recess.

Elroy H. Anderson et al, in U.S. Pat. No. 3,043,994, show an encapsulated coil having outwardly projecting terminals at one end of the assembly.

In U.S. Pat. No. 3,117,294, Peter C. Muszynski et al show a bobbin with insulated lead-in means wherein the respective terminals are received in recesses in flange portions of the bobbin. The terminals are provided with outturned tangs, or barbs, effectively preventing the terminals from being pulled out of the recesses.

Howard L. Erickson, in U.S. Pat. No. 3,226,606, shows a solenoid assembly wherein the terminals are brought radially outwardly from an end flange of the assembly.

In U.S. Pat. No. 3,371,302, Joseph A. Mas shows a transformer structure having a pair of terminals provided with resiliently outwardly biased connecting portions.

Arden D. Atherton, in U.S. Pat. No. 3,451,021, shows a self-sealing bobbin wherein the terminals are brought radially outwardly from an end portion of the bobbin.

SUMMARY OF THE INVENTION

The present invention comprehends an improved coil assembly structure wherein a terminal receiving recess is formed in a portion of the bobbin and provided with a central spreader element intermediate the sidewalls of the recess. The spreader element engages the portion of the terminal insert into the recess to maintain the inserted portion in a preselected disposition wherein biting means are carried thereon are retained in biting association with the sidewalls of the recess.

In the illustrated embodiment, the spreader element is formed integrally with the bobbin, and more specifically, with the end flange portion of the bobbin in which the recess is provided.

In the illustrated embodiment, a pair of such recesses is provided for use with a corresponding pair of terminals.

The inserted portion of the terminal may comprise a pair of legs each of which may be provided with a biting tang adapted to engage the opposed sidewalls of the recess transversely of the spreader element.

The spreader element may have a width slightly greater than the free spacing between the voids of the terminal whereby the spreader element biases the legs slightly apart in the installed arrangement of the terminal.

The distal end of the spreader element may be rounded for facilitated insertion of the terminal in straddling relationship thereto.

The spreader element may have a configuration generally complementary to the space between the terminal legs. In the illustrated embodiment, the spreader element has a length slightly shorter than the length of the space between the legs to assure a full, positive insertion of the terminal leg portions in the recess.

The coil assembly structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a coil assembly structure embodying the invention;

FIG. 2 is a top plan view thereof;

FIG. 3 is a top plan elevation of a terminal for use in the coil assembly structure;

FIG. 4 is a side elevation showing a wound coil on the bobbin in section and a connection of an end turn of the coil to one of the terminals of the coil assembly structure;

FIG. 5 is a top plan view of the assembly of FIG. 4 with a portion broken away to facilitate illustration of the invention;

FIG. 6 is a top plan view of the completed coil; and

FIG. 7 is a diametric section thereof taken substantially along the line 7—7 of FIG 6.

DESCRIPTION OF THE PREFERRED EMBODIMENT

In the exemplary embodiment of the invention as disclosed in the drawing, an encapsulated electrical coil generally designated 10 includes a wound coil 11 carried on a coil assembly structure generally designated 12. The coil assembly structure includes a bobbin generally designated 13 and a pair of terminals 14 and 15 with one end 16 of the coil 11 being connected to terminal 14 and the other end 17 of the coil 11 being connected to the terminal 15. The assembly may be encapsulated in a suitable encapsulating material 18 to define the completed coil 10, as shown in FIGS. 6 and 7.

The present invention is more specifically concerned with the association of the terminals 14 and 15 with the bobbin. In the illustrated embodiment, the bobbin defines an annular end flange 19 provided with a pair of recesses 20 and 21 opening through a planar side surface 22 of the flange. A guide slot 23 is further provided in the flange for guiding the wire 17 outwardly to the terminal 15, as illustrated in FIG. 5.

Terminal 15 is similar to terminal 14 illustrated in FIG. 3. Thus, each of the terminals includes an outer connector portion 24, a wire connecting portion 25, and a bifurcated inner end portion generally designated 26 defined by a pair of spaced legs 27 and 28. Leg 27 is provided at its distal end with a barb, or biting tang, 29, and leg 28 is provided at its distal end with a corresponding barb, or biting tang 30. As shown in FIG. 3, the tangs 29 and 30 extend outwardly in opposed relationship.

As best seen in FIG. 2, recess 20 defines a pair of opposed sidewalls 31 and 32, and recess 21 defines a corresponding pair of opposed sidewalls 33 and 34. Intermediate sidewalls 31 and 32, recess 20 is provided with an outwardly projecting spreader element 35; and intermediate sidewalls 33 and 34, recess 21 is provided with an outwardly projecting spreader element 36 similar to spreader element 35.

In the illustrated embodiment, the spreader elements 35 and 36 are formed integrally with the flange portion 19 of the bobbin 13.

As shown in FIGS. 2 and 3, the spreader elements 35 and 36 are substantially complementary to the space between the locking legs 27 and 28 of the terminal 14. The spreader elements 35 and 36 have a width slightly greater than the free spacing between legs 27 and 28 and a length slightly less than the length of the space 37 between the legs.

Terminals 14 and 15 may be further provided with stop shoulders 38 and 39 at the outer end of legs 27 and 28 which are adapted to abut the flange surface 22 when the bifurcated terminal end 26 is fully inserted in the corresponding recess. Thus, as best shown in FIG. 5, in the fully inserted arrangement, the inner ends of the legs 27 and 28 are spaced slightly outwardly of the inner end wall 40 of the recess.

In the inserted arrangement, as shown in FIG. 5, the legs 27 and 28 of the terminals portion 26 are spread slightly apart by the spreader element 36 so as to maintain the biting tangs 29 and 30 effectively positively embedded in the sidewalls of the recesses. The positive retention of the terminals in fixed association with the bobbin flange 19 is effected simply as the result of the insertion of the terminal portions 26 into the respective recesses until the stop shoulders 38 and 39 abut the flange surface 22 and, thus, the assembly of the terminals is extremely simple and economical while yet providing a solid mounting of the terminals to the bobbin for facilitated subsequent coil winding, coil end connection, and encapsulation operations.

The portions of terminals 14 and 15 defined by the stop shoulders 38 and 39 are completely covered by encapsulation material as shown in FIG. 6 so that once the encapsulation material 18 has cured the terminals are permanently embedded in place. To provide further improved retention of the terminals in the encapsulated coil structure, the terminals may be further provided with a plurality of locking holes 41 which are embedded in the encapsulating material so as to provide further positive locking shoulder means in the completed coil assembly.

As further seen in FIG. 2, the spreader elements 35 and 36 define, at their distal ends, rounded tips 42 for facilitating the insertion of the terminal portions 26 into the recesses with the spreader elements guiding the legs 27 and 28 resiliently slightly outwardly from their free position shown in FIG. 3 to assure the desired positive retention of the terminals in the recesses in the fully installed arrangement of FIG. 5.

In the illustrated embodiment, the sides of the spreader elements 35 and 36 are parallel, as shown in FIG. 2. As will be obvious to those skilled in the art, the spreader elements may be tapered outwardly so as to provide a gradual increase in the spreading action relative to the legs 27 and 28, as desired.

The foregoing disclosure of specific embodiments is illustrative of the broad inventive concepts comprehended by the invention.

The embodiments of the invention in which an exclusive property or privilege is claimed are defined as follows:

1. In a coil assembly structure having a bobbin about which a wire coil is adapted to be wound, the improvement comprising:

means defining a recess in fixed association with said bobbin, said recess being defined by opposed sidewalls, and an elongated, outwardly extending spreader element disposed in said recess intermediate said sidewalls and having substantially parallel side edges defining a substantially constant transverse extent of the spreader element along substantially its entire length, said spreader element extending a major portion of the depth of said recess; and a terminal having inner end portions defining spaced coplanar flat locking portions straddling said spreader element and having inner edges slidably engaging said parallel side edges of the spreader element in said recess and having transversely outwardly projecting biting means projecting into said sidewalls, said locking portions being maintained substantially a preselected distance transversely apart by said spreader element to retain said biting means in said sidewalls at all positions substantially the length of said spreader element.

2. In a coil assembly structure having a bobbin about which a wire coil is adapted to be wound, the improvement comprising:

means defining a recess in fixed association with said bobbin, said recess being defined by opposed sidewalls, and an elongated, outwardly extending spreader element disposed in said recess intermediate said sidewalls and having substantially parallel side edges defining a substantially constant transverse extent of the spreader element along substantially its entire length, said spreader element extending a major portion of the depth of said recess; and a terminal having inner end portions defining spaced coplanar flat locking portions straddling said spreader element and having inner edges slidably engaging said parallel side edges of the spreader element in said recess and having transversely outwardly projecting biting means projecting into said sidewalls, said locking portions being maintained substantially a preselected distance transversely apart by said spreader element to retain said biting means in said sidewalls at all positions substantially the length of said spreader element, said recess being defined by an inner end wall, said spreader element comprising an integral projection on said end wall having a rounded outer distal end and having a width slightly greater than the free spacing between said locking portions.

3. The coil assembly structure of claim 1 wherein said spreader element has a height in said recess substantially less than the height of the recess and extends from a single one of the longitudinal surfaces of the recess.

* * * * *